US009736663B1

(12) United States Patent
Reeves et al.

(10) Patent No.: US 9,736,663 B1
(45) Date of Patent: *Aug. 15, 2017

(54) MESSAGING SESSION ENHANCEMENT WITH USER DATA

(71) Applicant: Sprint Communications Company L.P., Overland Park, KS (US)

(72) Inventors: Raymond Emilio Reeves, Olathe, KS (US); Ambreen Haleem, Campbell, CA (US); Ryan Alan Wick, Apollo Beach, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/702,640

(22) Filed: May 1, 2015

Related U.S. Application Data

(63) Continuation of application No. 13/483,902, filed on May 30, 2012, now Pat. No. 9,066,217, which is a continuation of application No. 12/411,191, filed on Mar. 25, 2009, now Pat. No. 8,249,630.

(51) Int. Cl.
*H04W 4/12* (2009.01)
*H04W 12/00* (2009.01)
*H04W 4/14* (2009.01)
*H04L 29/06* (2006.01)

(52) U.S. Cl.
CPC ............ *H04W 4/14* (2013.01); *H04L 63/068* (2013.01); *H04L 63/0807* (2013.01)

(58) Field of Classification Search
CPC ........... H04W 4/20; H04W 4/18; H04W 4/12; H04W 12/02; H04W 12/00; H04W 4/14; H04W 4/00; H04W 4/02; H04W 4/006; H04W 4/003; H04W 28/06; H04W 4/16; H04W 4/08; H04W 12/10; H04W 76/02; H04W 76/021; H04W 92/08; H04W 88/02; H04W 88/023; H04W 88/184; G06Q 20/32; G06Q 30/02; G06Q 30/00; G06F 7/00; G06F 17/03; H04N 7/16; H04N 1/00312; H04I 63/068; H04L 63/0807

See application file for complete search history.

(56) References Cited

U.S. PATENT DOCUMENTS

| | | | |
|---|---|---|---|
| 7,590,705 B2 | 9/2009 | Mathew et al. | |
| 7,729,709 B1 * | 6/2010 | Loeb | H04L 67/18 455/2.01 |
| 7,818,762 B2 | 10/2010 | Liu et al. | |

(Continued)

OTHER PUBLICATIONS

Final Office Action dated Jan. 10, 2013 in U.S. Appl. No. 13/483,902, 27 pages.

(Continued)

*Primary Examiner* — Meless Zewdu

(57) ABSTRACT

Computer media, systems, and computer-implemented methods for enhancing SMS messaging sessions with user data are provided. A data sharing agreement between a service provider and a receiving entity, such as broadcaster or a consumer goods manufacturer, is established. A user with a wireless device sends an SMS message to the receiving entity. Data associated with the user is retrieved by the service provider in accordance with the data sharing agreement and is transmitted to the receiving entity along with the SMS message.

18 Claims, 4 Drawing Sheets

(56) References Cited

U.S. PATENT DOCUMENTS

| | | | |
|---|---|---|---|
| 7,900,245 B1* | 3/2011 | Geddes | H04L 63/0407 726/9 |
| 8,213,969 B2 | 7/2012 | Paik et al. | |
| 8,249,630 B1* | 8/2012 | Reeves | G06Q 30/02 455/466 |
| 9,066,217 B1* | 6/2015 | Reeves | H04W 4/18 |
| 2002/0087534 A1* | 7/2002 | Blackman | G06Q 10/10 |
| 2002/0095589 A1* | 7/2002 | Keech | G06F 21/6209 713/189 |
| 2002/0123360 A1* | 9/2002 | Vikman | H04Q 3/0029 455/466 |
| 2006/0166686 A1* | 7/2006 | Kim | H04W 4/06 455/466 |
| 2006/0205386 A1* | 9/2006 | Yu | H04L 9/12 455/411 |
| 2007/0105536 A1 | 5/2007 | Tingo, Jr. | |
| 2007/0124789 A1 | 5/2007 | Sachson et al. | |
| 2007/0162333 A1 | 7/2007 | Helm | |
| 2007/0174171 A1* | 7/2007 | Sheffield | G06Q 40/04 705/37 |
| 2007/0178881 A1* | 8/2007 | Teunissen | G06F 21/305 455/410 |
| 2008/0070593 A1* | 3/2008 | Altman | H04L 63/102 455/457 |
| 2008/0090597 A1* | 4/2008 | Celik | H04W 4/14 455/466 |
| 2008/0140665 A1* | 6/2008 | Ariel | G06Q 10/109 |
| 2008/0144796 A1* | 6/2008 | Ringland | H04M 3/42195 379/210.01 |
| 2008/0229384 A1* | 9/2008 | Hodgkinson | G06F 21/41 726/1 |
| 2008/0279381 A1* | 11/2008 | Narendra | H04L 9/0891 380/270 |
| 2008/0290987 A1* | 11/2008 | Li | G06Q 30/02 340/5.1 |
| 2008/0318559 A1 | 12/2008 | Porco | |
| 2009/0013087 A1* | 1/2009 | Lorch | H04M 1/72552 709/232 |
| 2009/0089131 A1* | 4/2009 | Moukas | G06Q 10/0631 705/70 |
| 2009/0138427 A1* | 5/2009 | Kalavade | G06Q 10/0637 |
| 2009/0186634 A1* | 7/2009 | Sureka | H04W 4/14 455/466 |
| 2009/0235176 A1* | 9/2009 | Jayanthi | H04L 12/189 715/738 |
| 2009/0319488 A1* | 12/2009 | Faure | G06F 21/6254 |
| 2010/0076853 A1 | 3/2010 | Schwarz | |
| 2011/0173337 A1* | 7/2011 | Walsh | H04W 4/023 709/229 |

OTHER PUBLICATIONS

First Action Interview Office Action dated Oct. 15, 2012 in U.S. Appl. No. 13/483,902, 11 pages.

First Action Interview Pre-Interview Communication dated Aug. 17, 2012 in U.S. Appl. No. 13/483,902, 10 pages.

Haddad, Elias and King, Brian, A Simple Secure M-Commerce Protocol SSMCP, Publication date Mar. 2007, 10 pages.

Non-Final Office Action dated Aug. 12, 2014 in U.S. Appl. No. 13/483,902, 26 pages.

Notice of Allowance dated Feb. 17, 2015 in U.S. Appl. No. 13/483,902, 7 pages.

Short Message Peer-to-Peer Protocol Specification, Version 5.0, Feb. 19, 2003, pp. 1-166, www.smsforum.net.

First Action Interview Office Action dated Sep. 13, 2011 in U.S. Appl. No. 12/411,191, 7 pages.

Final Office Action dated Nov. 8, 2011 in U.S. Appl. No. 12/411,191, 31 pages.

Notice of Allowance dated Apr. 13, 2012 in U.S. Appl. No. 12/411,191, 18 pages.

First Action Interview Pre-Interview Communication dated Jul. 19, 2011 in U.S. Appl. No. 12/411,191, 5 pages.

\* cited by examiner

MESSAGING SESSION ENHANCEMENT WITH USER DATA

PRIORITY

This application is a continuation of U.S. patent application Ser. No. 13/483,902, which was filed on May 30, 2012 and is a continuation of U.S. application Ser. No. 12/411,191, which was filed on Mar. 25, 2009 and each of the afore-mentioned patent applications are incorporated herein by reference in their entirety.

INTRODUCTION

Wireless devices such as mobile phones are commonly used to communicate. Increasingly, this communication occurs through text message. The predominant text messaging standard today is short message service (SMS). SMS messages are limited to a maximum message size of 160 characters. This size limitation severely constrains the amount of information that can be sent in one SMS message.

One common use of SMS messages is to communicate between a wireless device user and a receiving entity, such as a consumer goods manufacturer or television broadcast station. Such communication may occur because of a prompt to vote for one of a number of choices presented during a television program, prompt to register a purchased product in exchange for being registered for a prize drawing, prompt to purchase a product or software application, or other similar prompt. Because SMS messages must conform to the SMS standard, SMS messages sent by a user of a wireless device to a receiving entity for these purposes are also limited to a maximum of 160 characters.

SUMMARY

Embodiments of the invention relate to computer-implemented methods for enhancing SMS messaging sessions with user data, systems for enhancing SMS messaging sessions with user data, and computer storage media having computer-useable instructions embodied thereon for performing a method for enhancing SMS messaging sessions with user data. SMS messages are limited to 160 characters. Embodiments of the invention enhance SMS messaging sessions with user data such that information in excess of the 160-character limitation can be communicated when a user sends an SMS message to a receiving entity.

In one embodiment, providing that a data sharing agreement between a service provider and a receiving entity has been established, an SMS message sent to the receiving entity from a wireless device associated with a user is received by an SMS center (SMSC). The SMSC initializes data retrieval. User data is retrieved by an SMS exchange (SMSX) according to the established data sharing agreement. The retrieved data is stored in a data keeper component. The SMSC transmits the retrieved data and the SMS message to the receiving entity.

In further embodiments, one or more computer storage media having computer-useable instructions embodied thereon for performing a method to enhance SMS messaging sessions with user data are provided. Providing that a data sharing agreement between a service provider and a receiving entity has been established, the service provider receives data sharing authorization for a user. An SMSC receives an SMS message sent to the receiving entity from a wireless device associated with the user. The SMSC identifies data categories specified in the data sharing agreement established with the receiving entity and transmits the data categories, along with the identity of the user to an SMSX. The SMSX identifies the user's data sharing authorization and retrieves the user's data corresponding to the data categories specified by the data sharing agreement that are authorized by the user. The retrieved data is stored in a data keeper. The data keeper creates a security token, and transmits the security token to the SMSC. The SMSC transmits the security token, along with the SMS message, to the receiving entity. Upon receiving the security token back from the receiving entity within a specified time period after transmitting the security token and the SMS message to the receiving entity, the data keeper transmits the retrieved and stored data to the receiving entity. After transmitting the retrieved and stored data, the data keeper deletes the data. Upon not receiving the security token back from the receiving entity within a specified time period after transmitting the security token and the SMS message to the receiving entity, the data keeper deletes the retrieved and stored data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the invention are described in detail below with reference to the attached drawing figures, wherein.

DETAILED DESCRIPTION

Figure 1:
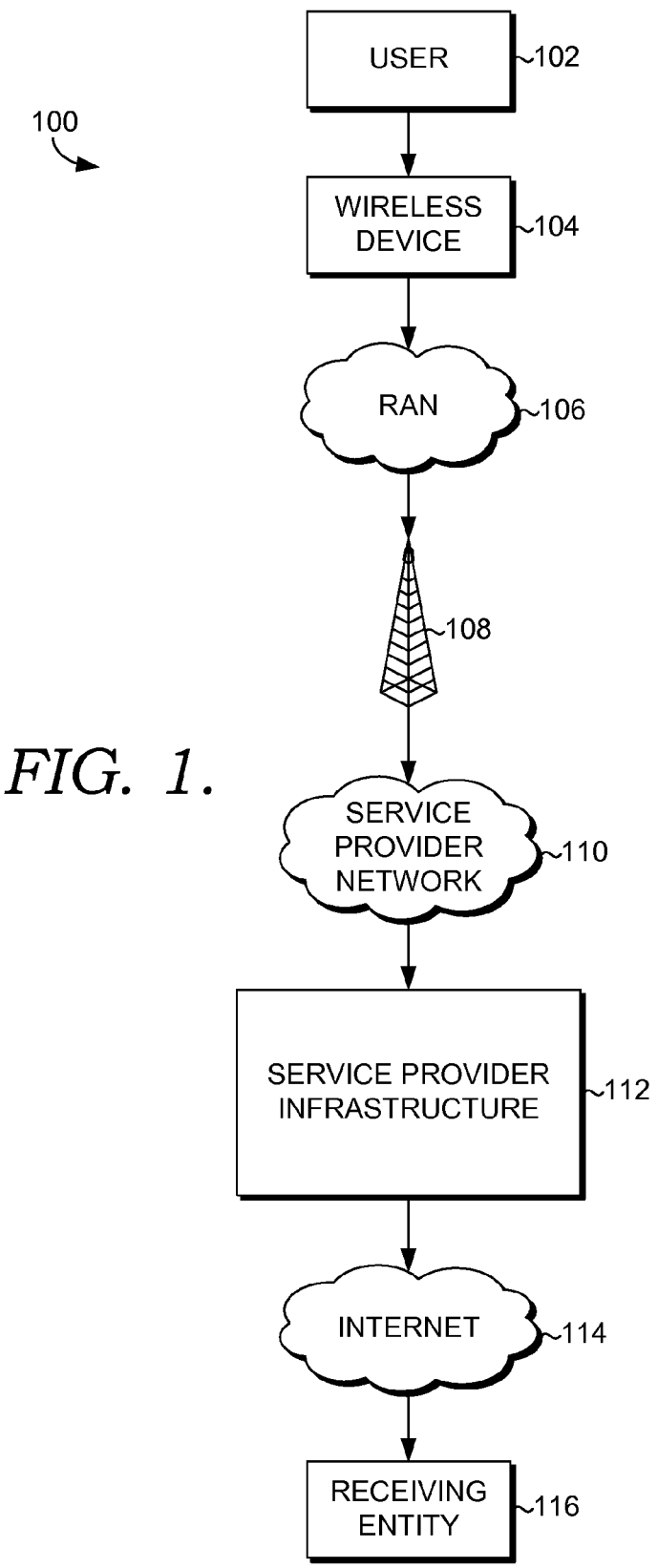
FIG. 1 is a block diagram of a system for enhancing an SMS messaging session with user data according to an embodiment of the invention.

Embodiments of the invention are described with specificity herein to meet statutory requirements. However, the detailed description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Throughout this patent, several acronyms and shorthand notations are used to aid the understanding of certain features of the associated embodiments. These acronyms and shorthand notations are solely intended to communicate more clearly the features described herein and are in no way meant to limit the scope of the embodiments of the invention. The following is a list of these acronyms:

CD-ROM Compact Disk Read Only Memory
DVD Digital Versatile Discs
EEPROM Electrically Erasable Programmable Read Only Memory
GSM Global System for Mobile Communication
PDA Personal Digital Assistant
RAM Random Access Memory
RAN Radio Access Network
ROM Read Only Memory SMS Short Message Service
SMSC Short Message Service Center
SMSX Short Message Service Exchange
UTMS Universal Mobile Telecommunications System Embodiments of the invention include, among other things, a computer-implemented method, system, or a computer program product. Accordingly, the embodiments may take the form of a hardware embodiment, a software embodiment, an embodiment combining software and hardware, or a computer program product that includes computer-useable instructions embodied on one or more computer storage media.

Computer storage media include both volatile and nonvolatile media, removable and nonremovable media, as well as media readable by a database, switch, or various other network devices. By way of example, and not limitation, computer storage media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, DVD, holographic media or other optical disc storage, magnetic cassettes, magnetic tape, magnetic disk storage, and other magnetic storage devices. These technologies can store data momentarily, temporarily, or permanently.

Embodiments of the invention relate to computer-implemented methods for enhancing SMS messaging sessions with user data, systems for enhancing SMS messaging sessions with user data, and computer storage media having computer-useable instructions embodied thereon for performing a method for enhancing SMS messaging sessions with user data.

As discussed above, one common use of SMS messages is to communicate between a user of a wireless device and a receiving entity, such as a consumer goods manufacturer or television broadcaster. The user may view a prompt during a television program instructing the user to vote for one of a number of selections by sending an SMS message to the television broadcaster. Similarly, the user may view a television commercial or read a print advertisement inviting the user to send an SMS message to a consumer goods manufacturer to enter the user in a drawing for a prize. A user may additionally send an SMS message to a receiving entity to purchase a product or software application.

SMS messages are limited in size to 160 7-bit characters, 140 8-bit characters, or 70 16-bit characters. A maximum message size of 160 characters restricts the information that can be sent in an SMS message. Such a small message size may be adequate for voting for a selection, entering a drawing, registering a purchase, or other reasons why users send SMS messages to receiving entities. Often, however, a receiving entity may wish to obtain more information about the user whose wireless device transmitted the SMS message. Including such information in the SMS message would cause the message to exceed the 160-character maximum.

A receiving entity may receive a variety of information about a user who has sent SMS messages to the entity. For example, a receiving entity may receive the location of the user when the SMS message was sent. A receiving entity may also receive demographic information about the user, including, but not limited to, age, income range, marital status, sex, ethnicity, and zip code. Financial information such as the user's credit score or bill payment history may also be transmitted to a receiving entity. Receiving entities may use such information for marketing, business planning, or other purposes. Embodiments of the invention enhance an SMS messaging session because instead of receiving only an SMS message, a receiving entity also receives user data.

FIG. 1 illustrates a block diagram of a system 100 for enhancing an SMS messaging session with user data. User 102 is associated with wireless device 104. Wireless device 104 may be a cellular phone, web-enabled cellular phone, PDA or other "smart" phone, or other wireless device. Wireless device 104 is in communication with radio access network (RAN) 106. RAN 106 may be implemented in the global system for mobile communication (GSM), universal mobile telecommunications system (UMTS), or other standard. Wireless device 104 communicates through RAN 106, to cell tower 108, and to a service provider network 110. Service provider network 110 is the network of a company that provides wireless or wired service to customers.

Service provider infrastructure 112 is in communication with service provider network 110. Service provider infrastructure 112 comprises the hardware and software components of a service provider, including, but not limited to, servers, databases, switches, routers, and data storage devices. The functionality of service provider infrastructure 112 may be consolidated into one physical computing device or may be distributed among multiple computing devices. Service provider infrastructure 112 is connected through the Internet 114 to receiving entity 116. Service provider infrastructure 112 may also connect to the Internet 114 through service provider network 110. Receiving entity 116 may be a commercial entity, such as a television broadcaster or consumer goods manufacturer that solicits SMS messages from viewers or consumers, respectively. Receiving entity 116 could also be a non-profit or governmental organization.

Figure 2:
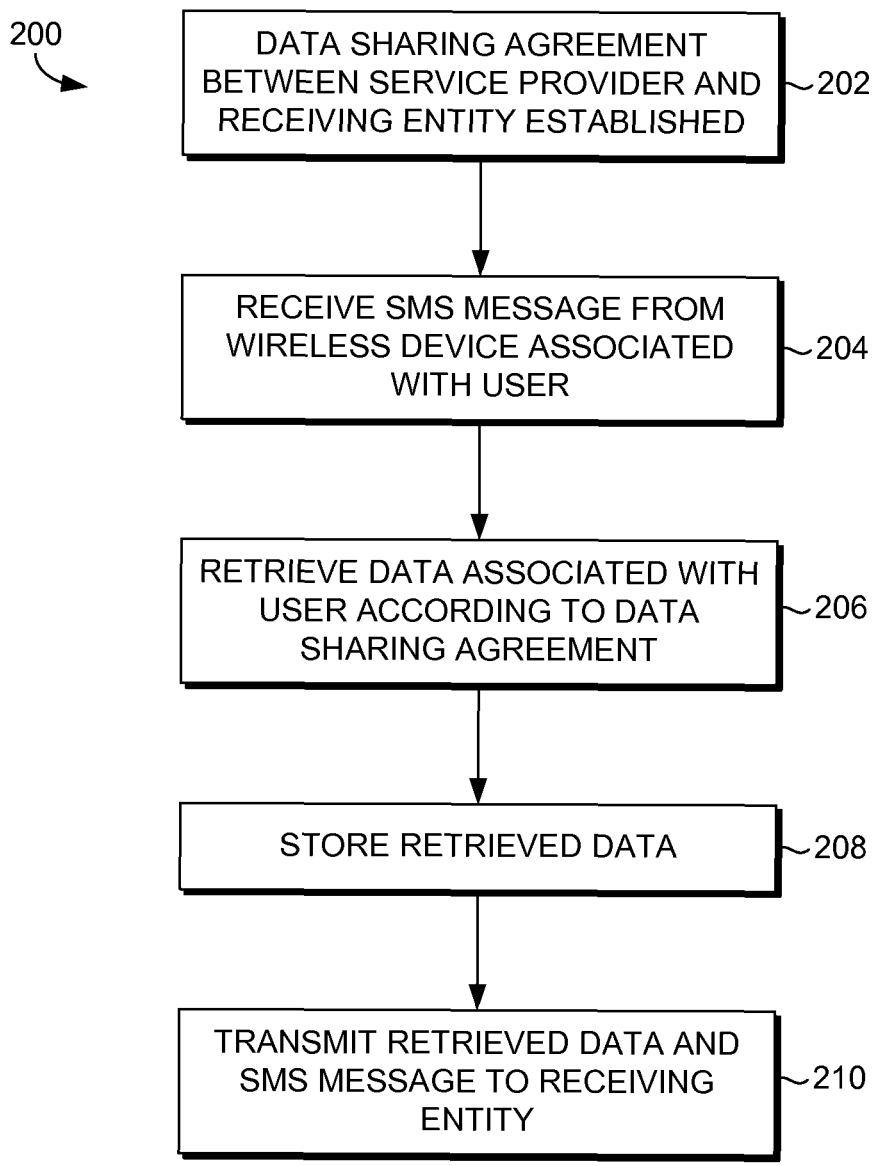
FIG. 2 is a flow chart of an exemplary method for enhancing an SMS messaging session with user data.

FIG. 2 illustrates an exemplary method 200 for enhancing an SMS messaging session with user data. A data sharing agreement between a service provider and a receiving entity is established in step 202. A receiving entity, such as a television broadcaster, contacts the major service providers to establish agreements. The receiving entity develops a list of the categories of data it is interested in gathering about users who send the receiving entity SMS messages. Each receiving entity may have different business strategies and consequently may wish to gather different categories of data about SMS-sending users. Each service provider will reach an agreement to provide all, some, or none of the data the receiving entity desires. Service providers may require user consent before user data is retrieved and provided to a receiving entity. For some categories of user data, such as location of the wireless device associated with the user when an SMS message is sent, user consent may not be required.

In step 204, an SMS message sent from a wireless device associated with a user is received. The SMS message may be received by the service provider infrastructure. As discussed above, the SMS message may be sent in response to a prompt from a television program, advertisement, print media, or other product. User data, in accordance with the established data sharing agreement, is retrieved in step 206. The service provider infrastructure may access the established data sharing agreement to determine which categories of data the receiving entity is interested in gathering. Service provider infrastructure 112 then retrieves the data, which may be stored in a database. Because the user is a customer of the service provider, the service provider will already possess the user's demographic and financial information and will also be able to determine the location of the wireless device when the user sent the SMS message. If retrieval of particular types of data must be authorized by the user before retrieval, the service provider infrastructure accesses a database of user authorization, which stores the expressed data sharing authorization of individual users, before retrieving those particular types of data. In some embodiments, user authorization is obtained each time an SMS message is sent to a receiving entity.

With continued reference to FIG. 2, user data retrieved in step 206 is stored in step 208. The retrieved data may be stored in the service provider infrastructure. The retrieved data may be stored in a separate data storage component within the service provider infrastructure and may be stored in a spreadsheet, table, database, text file, or other storage structure. In step 210, the user data retrieved in step 206 and stored in step 208 is transmitted to the receiving entity along with the SMS message. In some embodiments, the data transmitted in step 208 is transmitted to the receiving entity via the Internet.

Figure 3:
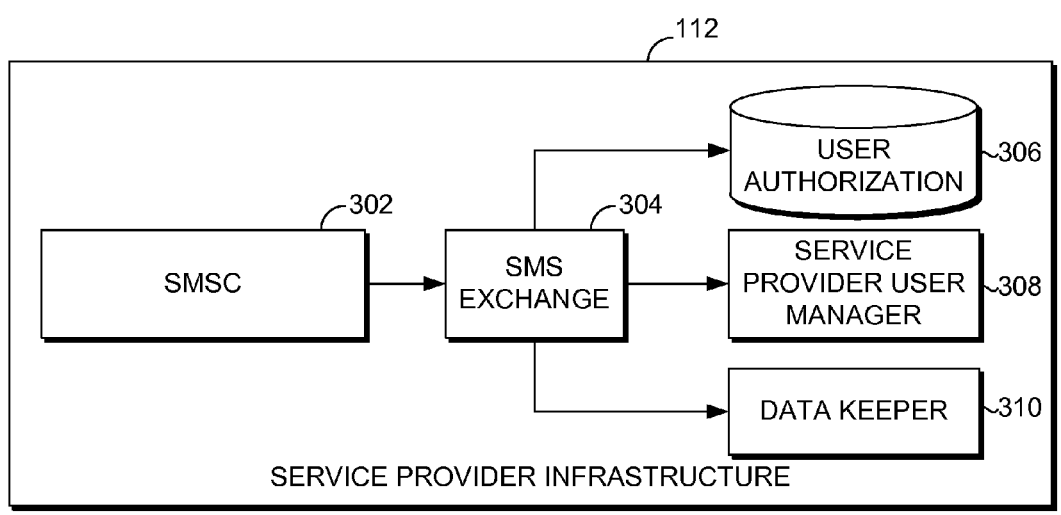
FIG. 3 is a block diagram of a service provider infrastructure according to an embodiment of the invention.

FIG. 3 illustrates a block diagram of a system 300 for enhancing an SMS messaging session with user data. In system 300, service provider infrastructure 112 is shown as multiple components. These components may be functional components of one computing device or physically separate components within service provider infrastructure 112.

Service provider infrastructure 112 includes SMS center (SMSC) 302. SMSC 302 receives SMS messages sent to a receiving entity from a wireless device associated with a user. SMSC 302 is in communication with a service provider network. SMSC 302 also may initialize data retrieval, which is carried out by SMS exchange (SMSX) 304. SMSC 302 may transmit retrieved data, along with the SMS message, to a receiving entity via the Internet. SMSC 302 may also access the established data sharing agreement the service provider has reached with the receiving entity to determine which categories of data should be retrieved by SMSX 304.

SMSX 304 retrieves the data associated with the user according to the established data sharing agreement. SMSX 304 may access the established data sharing agreement, or SMSC 302 may provide SMSX 304 with the categories of data requested by the receiving entity. In embodiments where user authorization is required before data associated with a user is retrieved, SMSX 304 is in communication with user authorization database 306. User authorization database 306 stores data sharing preferences for one or more users. Each individual user may decide to allow certain information to be retrieved, such as location of the wireless device when the SMS message was sent, but not allow other information to be retrieved, such as the user's credit score. In such embodiments, the data retrieved by SMSX 304 is limited by both the established data sharing agreement and user authorization database 306.

SMSX 304 communicates with service provider user manager 308 to retrieve requested and authorized data. The requested and authorized data may be located in service provider user manager 308. Service provider user manager 308 may alternatively access user data stored in other locations. Service provider user manager 308 may be a server with access to local and remote databases. Service provider user manager 308 provides SMSX 304 the requested and authorized data. SMSX 304 stores the retrieved data in data keeper 310. The retrieved data may be stored in a spreadsheet, table, database, text file, or other storage structure. In some embodiments, the retrieved data is only stored in data keeper 310 for a short period of time. SMSX 304 transmits the retrieved data stored in data keeper 310 to SMSC 302. Data keeper 310 may create a security token that is sent, along with the SMS message, by SMSC 302 to the receiving entity. In such embodiments, retrieved user data is retained in data keeper 310 until the security token has been retransmitted by the receiving entity and received by SMSC 302. After receiving the retransmitted security token, SMSC 302 transmits the retrieved user data to the receiving entity through the Internet. In embodiments where no security token is created, SMSC 302 transmits the retrieved user data and the SMS message together to the receiving entity.

Figure 4:
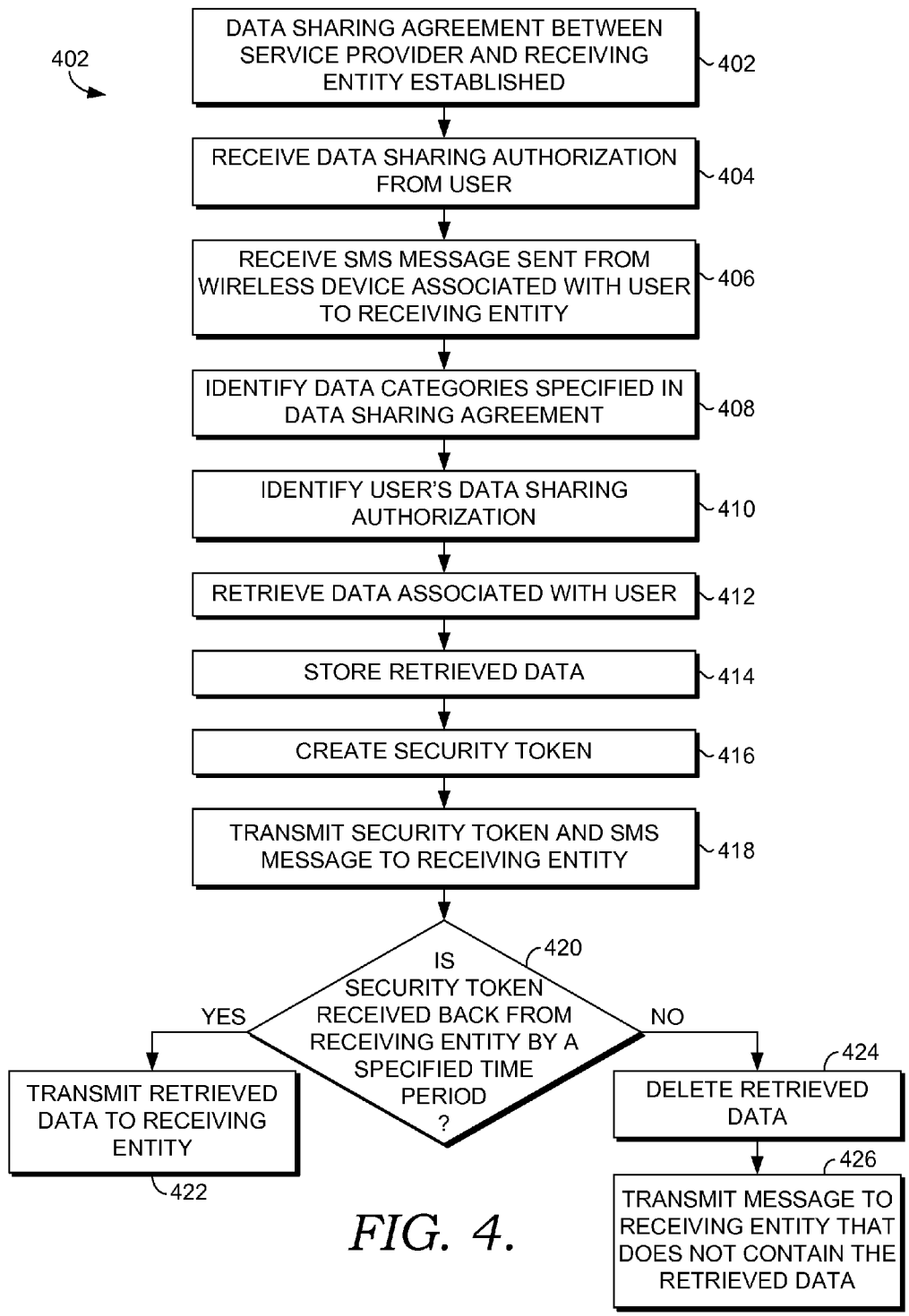
FIG. 4 is a flow chart of an exemplary method for enhancing an SMS messaging session with user data.

FIG. 4 illustrates an exemplary method 400 of enhancing an SMS messaging session with user data. Method 400 may be implemented on system 300 of FIG. 3. In step 402, an established data sharing agreement between a service provider and a receiving entity is provided. As discussed above, a receiving entity develops a list of the categories of data it is interested in gathering about users who send the receiving entity SMS messages. Each service provider reaches an agreement to provide all, some, or none of the data the receiving entity requests. In step 404, data sharing authorization from the user is received. Data sharing authorization may be received by any component of the service provider infrastructure. The user is a customer of the service provider. Each of the service provider's customers authorizes the categories of data that customer is willing to allow the service provider to share. In some embodiments, user data sharing authorization is not required for some or all user data.

An SMS message sent from a wireless device associated with a user to a receiving entity is received in step 406. The SMS message may be received by an SMSC. In step 408, data categories specified in the established data sharing agreement between the service provider and the receiving entity are identified. These data categories may include, but are not limited to, location of the wireless device when the SMS message was sent, demographic information, and financial information. The specified data categories may be identified by the SMSC. In alternate embodiments, an SMSX may perform step 408. In some embodiments, the data categories identified in step 408, along with the identity of the receiving entity and the identity of the user, are transmitted to the SMSX.

The user's data sharing authorization is identified in step 410. This may be performed by the SMSX. In one embodiment, SMSX 304 accesses a user authorization database to determine which categories of data the user has authorized to be shared with a receiving entity. The SMSX initiates retrieval of data that is both agreed to in the established data sharing agreement and authorized by the user. In some embodiments, user data sharing authorization is not required, and all data categories agreed to in the data sharing agreement are retrieved.

In step 412, data that is both agreed to in the established data sharing agreement and authorized by the user is retrieved. In one embodiment, the SMSX retrieves the data from a service provider user manager. The service provider user manager may have the data available and transmit the data to the SMSX. Alternatively, the service provider user manager may locate the data from elsewhere in the service provider infrastructure and transmit the data to the SMSX. Each category of data retrieved may be located in a different functional or physical component within the service provider infrastructure.

Data retrieved in step 412 is stored in step 414. In one embodiment, the retrieved data is stored in a data keeper. Data may be stored in a spreadsheet, table, database, text file, or other storage structure. The data keeper may be in direct communication with the SMSC or the Internet, in addition to the SMSX. In some embodiments, the stored data is deleted after a short period of time.

In step 416, a security token is created. In some embodiments, the security token is created by the data keeper. The security token may also be created by the SMSX or the SMSC. The security token created in step 416, along with the SMS message, is transmitted to the receiving entity in step 418. In embodiments where the security token is created by the data keeper, the security token may be transmitted to the SMSC either directly or through the SMSX. The SMSC transmits the security token and the SMS message to the receiving entity through the Internet. The retrieved data remains within the service provider infrastructure until the security token is retransmitted by the receiving entity and received by a component within the service provider infrastructure.

In step 420, the service provider infrastructure determines whether or not the transmitted security token has been retransmitted by the receiving entity and received by a component within the service provider infrastructure. In some embodiments, the data keeper is in communication directly with the receiving entity through the Internet. In such embodiments, the security token may be retransmitted to the data keeper. If a specified time period has not elapsed, then the data retrieved and stored in the data keeper is transmitted to the receiving entity in step 422. In some embodiments, the data retrieved and stored in the data keeper is deleted upon transmission to the receiving entity. If a specified time period has elapsed, that is, if the security token was not retransmitted and received quickly enough, then the retrieved and stored data in the data keeper is deleted. A message may be sent to the receiving entity indicating that no data is being sent. In other embodiments, no reply is sent to the receiving entity. In some embodiments, all communication with the receiving entity occurs through the SMSC.

An additional security measure is present in some embodiments of the present invention. Upon creation of the security token in step 416, if a specified time period has elapsed between identification of the data categories specified in the data sharing agreement in step 408 and creation of the security token in step 416, the retrieved and stored data is deleted.

Embodiments of the invention described above are intended in all respects to be illustrative rather than restrictive. It will be understood that certain features and sub-combinations are of utility and may be employed without reference to other features and sub-combinations. This is contemplated by and is within the scope of the claims.

The invention claimed is:

1. A computer-implemented method for enhancing short message service (SMS) messaging sessions by supplementing the SMS messaging sessions with user data, the computer-implemented method comprising:
   receiving an SMS message sent to a device associated with a receiving entity from a wireless device associated with a user;
   retrieving data associated with the user according to an established data sharing agreement;
   obtaining user consent for a subset of the retrieved data, wherein the consent authorizes sharing of the subset of the retrieved data with the receiving entity;
   storing the retrieved data; and
   transmitting the SMS message to the device associated with the receiving entity, wherein the device associated with the receiving entity is a device other than the wireless device associated with the user, wherein the transmitting comprises:
   creating a security token;
   transmitting the security token and the SMS message to the receiving entity; and
   upon receiving the security token back from the receiving entity within a specified time period after transmitting the security token and the SMS message to the receiving entity, transmitting the retrieved data to the receiving entity, and deleting the retrieved data.

2. The method of claim 1, wherein the retrieved data comprises a location of the wireless device associated with the user when the SMS message was sent.

3. The method of claim 1, wherein the retrieved data comprises demographic information.

4. The method of claim 1, wherein the retrieved data comprises financial information.

5. The method of claim 1, further comprising deleting the retrieved data after transmitting the retrieved data and the SMS message to the receiving entity.

6. The method of claim 1, further comprising receiving user data sharing authorization.

7. The method of claim 6, wherein retrieving data further comprises:
   identifying data categories specified in the data sharing agreement established with the receiving entity;
   identifying the user's data sharing authorization; and
   retrieving user data authorized by the user's data sharing authorization that corresponds to the data categories specified by the data sharing agreement.

8. The method of claim 1, wherein upon not receiving the security token back from the receiving entity within the specified time period, deleting the retrieved data.

9. A wireless system for enhancing short message service (SMS) messaging sessions by supplementing the SMS messaging sessions with user data, the system comprising:
   an SMS center (SMSC) component that receives one or more SMS messages sent from a wireless device associated with a user to a device associated with a receiving entity, initializes data retrieval, and transmits the one or more SMS messages to the device associated with the receiving entity, wherein the device associated with the receiving entity is a device other than the wireless device associated with the user;
   an SMS exchange (SMSX) component that retrieves data associated with the user according to an established data sharing agreement and obtains consent for the retrieved data; and
   a data keeper component that stores the data retrieved by the SMSX component that was consented by the user for transmission to the receiving entity,
   wherein the transmission comprises,
   creating a security token,
   transmitting the security token and the SMS message to the receiving entity,
   upon receiving the security token back from the receiving entity within a specified time period after transmitting the security token and the SMS message to the receiving entity, transmitting the retrieved data to the receiving entity.

10. The wireless system of claim 9, further comprising a user authorization database containing authorization to access particular types of data for one or more users, wherein the user authorization database is accessed by the SMSX, and the data retrieved by the SMSX is limited to the data authorized by the user authorization database.

11. The wireless system of claim 9, wherein the SMSC accesses the data sharing agreement to determine which categories of data will be retrieved by the SMSX.

12. The wireless system of claim 9, wherein the retrieved data comprises a location of the wireless device associated with the user when the SMS message was sent.

13. The wireless system of claim 9, wherein the data keeper component creates the security token upon storing the retrieved data and transmits the security token to the SMSC component.

14. The wireless system of claim 13, wherein the SMSC component transmits the security token along with the one or more SMS messages to the receiving entity.

15. The wireless system of claim 14, wherein upon receiving the security token retransmitted by the receiving entity, the data keeper transmits the retrieved data to the receiving entity.

16. One or more non-transitory computer storage media having computer-useable instructions that, when used by one or more computing devices, cause the one or more computing devices to perform a method to enhance short message service (SMS) messaging sessions by supplementing the SMS messaging sessions with user data, the method comprising:

receiving an SMS message sent to a device associated with a receiving entity from a wireless device associated with a user;

retrieving the user's data corresponding to data categories specified in a data sharing agreement that are authorized by the user; and transmitting the SMS message to the device associated with the receiving entity, wherein the device associated with the receiving entity is a device other than the wireless device associated with the user, wherein the transmitting comprises:

creating a security token;

transmitting the security token and the SMS message to the receiving entity;

upon receiving the security token back from the receiving entity within a specified time period after transmitting the security token and the SMS message to the receiving entity, transmitting the retrieved data to the receiving entity, and deleting the retrieved data.

17. The media of claim 16, wherein the method further comprises:

upon not receiving the security token back from the receiving entity within the specified time period, deleting the retrieved data.

18. The media of claim 16, wherein the retrieved data comprises a location of the wireless device associated with the user when the SMS message was sent, demographic information, or financial information.

* * * * *